United States Patent
Smith et al.

(10) Patent No.: US 7,660,817 B2
(45) Date of Patent: Feb. 9, 2010

(54) SYSTEM AND METHOD FOR REPRESENTING CONTENT IN A FILE SYSTEM

(75) Inventors: Gregory R Smith, Bellevue, WA (US); George G Robertson, Seattle, WA (US); Mary P Czerwinski, Woodinville, WA (US); Patrick M Baudisch, Seattle, WA (US); Brian R Meyers, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 10/852,006

(22) Filed: May 24, 2004

(65) Prior Publication Data

US 2004/0236769 A1    Nov. 25, 2004

Related U.S. Application Data

(60) Provisional application No. 60/472,511, filed on May 22, 2003.

(51) Int. Cl.
G06F 17/30 (2006.01)

(52) U.S. Cl. .................. 707/103 R; 707/103 Y

(58) Field of Classification Search ............... 707/1–10, 707/100–104.1, 200–206, 103 X, 103 Y, 707/103 Z, 103 R; 717/108, 101, 120, 162, 717/713; 705/1; 713/187; 715/521; 703/22, 703/26; 714/38; 379/9.01; 345/650, 661, 345/676

See application file for complete search history.

(56) References Cited

U.S. PATENT DOCUMENTS

| | | | |
|---|---|---|---|
| 5,305,435 A | 4/1994 | Bronson | |
| 5,694,561 A | 12/1997 | Malamud et al. | |
| 5,790,120 A | 8/1998 | Lozares et al. | |
| 6,005,579 A | 12/1999 | Sugiyama et al. | |
| 6,404,443 B1 | 6/2002 | Westerman | |
| 6,544,295 B1 | 4/2003 | Bodnar | |
| 6,717,596 B1 | 4/2004 | Nason et al. | |
| 6,756,999 B2 | 6/2004 | Stoakley et al. | |
| 6,931,412 B2 * | 8/2005 | Uyttendaele et al. | 707/101 |
| 7,010,755 B2 | 3/2006 | Anderson et al. | |
| 7,051,276 B1 * | 5/2006 | Mogilevsky et al. | 715/517 |

(Continued)

FOREIGN PATENT DOCUMENTS

DE    3618256.7    12/1987

(Continued)

OTHER PUBLICATIONS

Stefano Ceri et al., Web Modeling Language (WebML): a modeling language for designing web sites, Jun. 2000, Computer Networks, vol. 33, Issues 1-6, pp. 137-157.*

(Continued)

*Primary Examiner*—Diane Mizrahi
(74) *Attorney, Agent, or Firm*—Lee & Hayes, PLLC

(57) ABSTRACT

A system and method for representing content state in a file system is provided. A file system includes a unique database object that is representative of the object content. The unique database object serves as a link container and includes a plurality of links to additional unique database objects that are properties of the representation of content. The link container database object also maintains additional fields that define additional properties for the representation of content.

34 Claims, 7 Drawing Sheets

U.S. PATENT DOCUMENTS

| | | | |
|---|---|---|---|
| 7,124,373 | B1 | 10/2006 | Patil |
| 7,308,449 | B2 * | 12/2007 | Fairweather .................. 707/10 |
| 7,181,697 | B2 | 2/2008 | Tai et al. |
| 2001/0035882 | A1 | 11/2001 | Stoakley et al. |
| 2002/0138582 | A1 * | 9/2002 | Chandra et al. ............. 709/206 |
| 2003/0126139 | A1 * | 7/2003 | Lee et al. ..................... 707/100 |
| 2004/0066414 | A1 | 4/2004 | Czerwinski et al. |
| 2006/0115822 | A1 * | 6/2006 | Webb et al. ..................... 435/6 |
| 2006/0277499 | A1 * | 12/2006 | Britt et al. ................... 715/828 |
| 2007/0016607 | A1 * | 1/2007 | Yu et al. ..................... 707/102 |
| 2008/0120129 | A1 * | 5/2008 | Seubert et al. ................. 705/1 |

FOREIGN PATENT DOCUMENTS

| | | |
|---|---|---|
| FR | 2693810 | 1/1994 |

OTHER PUBLICATIONS

Andruid Kerne et al., A recombinant Informatioin Space, Sep. 2003, University of Teeside(UK), School of Computing and Mathematics, Virtual Environment Group, pp. 1-10.*

Paul Prescod et al., Addressing the Enterprise: Why the Web needs Grooves, ISOGEN Consulting Engineer, http://xml.coverpages.org/prescodGroves199606.html, pp. 1-16.*

Prescod et al., Addressing the Enterprise: Why the Web needs Grooves, ISOGEN Consulting Engineer, http://xml. coverpages.org/prescodGroves199606.html, pp. 1-16. Jun. 1996.

Keme et al., A recombinant Informatioin Space, Sep. 2003, University of Teeside(UK), School of Computing and Mathematics, Virtual Environment Group, pp. 1-10.

Sorting Algorithm. Wikipedia.org; http://en.wikipedica.org/wiki/Sorting_algorithm. Last accessed Jul. 29, 2008, 12 pages.

Czerwinski, Reply to Non-final Office Action dated Jul. 29, 2008, 32 pages.

Angelo. "The Linux (Multiple) Virtual Desktops Unleashed - Part I: Overview," MozillaQuest.com, May 7, 2004, p. 1. http://www.mozillaquest.com/Linux4Windows/Linux4Windows08/Linux4Windows_04_08_Story-01.html. Retrieved Jul. 19, 2006, 20 pgs.

Angelo. "The Linux (Multiple) Virtual Desktops Unleashed - Part I: Overview," MozillaQuest.com, May 7, 2004, p. 2. http://www.mozillaquest.com/Linux4Windows/Linux4Windows08/Linux4Windows_04_08_Story-01.html. Retrieved Jul. 19, 2006, 19 pgs.

Dances With Crows, "Re: How Do I Configure X to be One Screen/One Window (Like Window$) with Window$ Look and Feel?" Sep. 23, 2002, Online Newsgroup: conp.os.linus.x, http://groups.gogle.de/group/compos.linux.x/msg/4a405e4fa65bc94b?dmode=source&h1=fr&output=gplain. Retrieved Aug. 21, 2006, 3 pgs.

Nation, "Fvwm Version 1.21c X-11 Window Manager is Available," Mar. 10, 1994, Online Newsgroup: comp. windows.x.i386unix, http://groups.google.de/group/comp.windows.x.i386unix/msg/7855f990bc68302? dmode=source&h1=fr&output=gplain. Retrieved Jul. 20, 2006, 2 pgs.

Hiner, DragThing v4.3, Jun. 14, 2002 (APPLE) http://www.applelinks.com/reviews/dragthing-v4.shtml.

Thomson, DragThing v4.3 Apr. 19, 2002 (DT1) http://web.archive.org/web20020524155927/http://www.dragthing.com/.

Thomson, DragThing versino history v4.3 and below pp. 4-20, Apr. 9, 2002 (DT2) http://web.archive.org/ web/20020409150945/www.dragthing.com/english/history.html.

Horvitz, E., Smith, G., Meyers, B., & Wilhite, S. (Submitted, 2003). Interruptions and Task Switching: From Diary Study to Design, Submitted to Human-Computer Interaction—Interact '03, Stolus, M. (Ed.), IOS Press, pp.*-*. Copyright IFIP, 2003, Zurich, Switzerland.

Stefano Ceri et al., Web Modeling Language (WebML): a modeling language for designing web sites, Jun. 2000, Computer Networks, vol. 33, Issures 1-6, pp. 137-157.

Andruid Keme et al., A recombinant Informatioin Space, Sep. 2003, University of Teeside(UK), School of Computing and Mathematics, Virtual Environment Group, pp. 1-10.

Paul Prescod et al., Addressing the Enterprise: Why the Web needs Grooves, ISOGEN Consulting Engineer, http://xml.coverpages.org/prescodGroves199606.html, pp. 1-16. Jun. 2006.

Czerwinski, M., Horvitz, E, Smith, G., Meyers, B., & Wilhite, S. (Submitted, 2003). Interruptions and Task Switching: From Diary Study to Design, Submitted to Human-Computer Interaction-Interact '03, Stolus, M. (Ed.), IOS Press, pp.*-*. Copyright IFIP, 2003, Zurich, Switzerland.

JP OA dated Sep. 19, 2008 for JP Application Serial No. 2003-350054, p. 37.

* cited by examiner

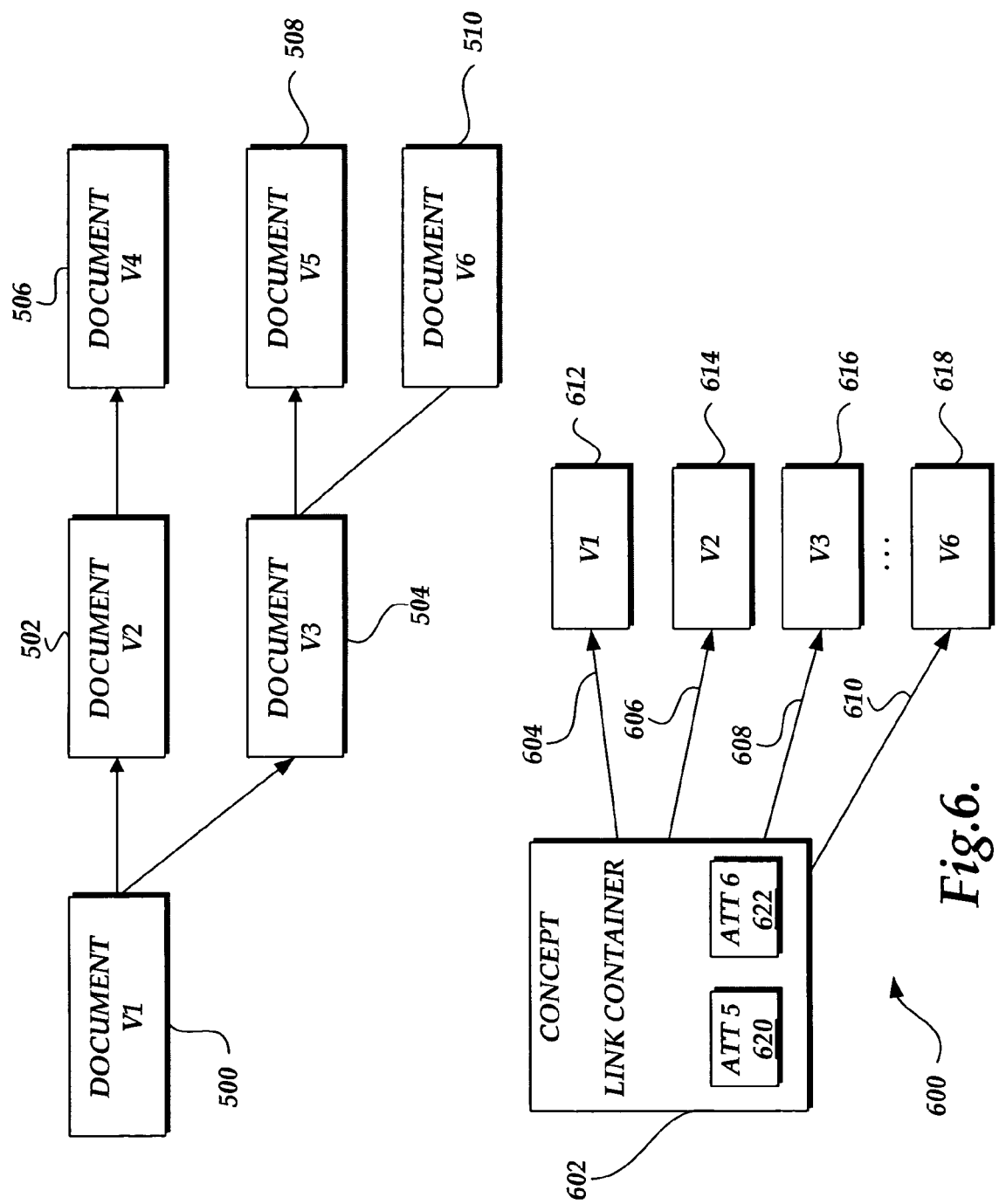

SYSTEM AND METHOD FOR REPRESENTING CONTENT IN A FILE SYSTEM

CROSS-REFERENCE TO RELATED APPLICATIONS

This application claims the benefit of U.S. Provisional Application No. 60/472,511, entitled SYSTEM AND METHOD FOR PRESERVING CONTENT STATE, and filed on May 22, 2003. U.S. Provisional Application No. 60/472,511 is incorporated by reference herein.

FIELD OF THE INVENTION

Generally described, the present invention relates to computer software and data processing, and in particular, to a system and method for representing content state in a file system.

BACKGROUND OF THE INVENTION

Generally described, computer systems provide users with a dynamic and interactive operating environment for varied uses. For example, a user may utilize different sets of software applications and/or access different pieces of content during normal use throughout the day. For example, a user may access a word processing software application during the morning and a financial software application during the afternoon. In addition to using a series of software applications and pieces of content sequentially in time, users can also utilize multi-tasking functionality and windowing abilities to work with multiple software applications and pieces of content at the same time. Often, a set of multiple software applications and content windows will be related and associated with a user-defined goal or task. The user-defined association can generally be referred to as a project. For example, a user can associate a word processing software application, a particular word processing document, an accounting software application and a corresponding file, a database software application, and a particular database source file as part of an "Accounting Project." Still similarly, in another example, users can work on an electronic document, such as a word processing document, in which multiple versions can be created throughout the life of the document. For example, a user can forward a draft of an electronic document to several reviewers and receive any number of revised drafts in return. This set of drafts and documents may also be referred to as a particular writing project.

In all of the above examples, one or more users can have the need to store current state information associated with the data/content being accessed. Additionally, the users can have the need to recall the state of the data/content in the future. Furthermore, the set of relevant state information can be distributed across a set of documents, software applications, settings and configurations. For example, a user may wish to make a record of the appearance, layout and content within all instantiated software applications at a point in time. Accordingly, the user could be able to recall the appearance, layout and/or content at some point in the future, such as to continue working at a point where work on a piece of content was previously interrupted. With reference to the previous example, the user in the afternoon may wish to recall the current appearance, layout and content of the word processing software application that the user was accessing in the morning. In a similar manner and with continued reference to the previous examples, a user may wish to recall the Accounting Project and have the computer system instantiate all necessary software applications, organize the software applications on the user's graphical display and recall the most recent version of content accessed by the user. Still further, in the above examples, the user may wish to have a map of the version history of documents that the user accessed over time. For example, the user may wish to use the version history of a document and the visualization of inter-document differences to reconcile several different reviewers' comments to generate a consolidated new version of the document.

One conventional approach to preserving content state corresponds to a document model in which an electronic document serves as the focus of state information. In one aspect, the document model is limited in that at least some state information is not necessarily associated with an individual document. For example, preferred screen location information (corresponding to a graphical user interface) is not naturally associated with a document itself. In one example, a document might have several preferred screen locations depending on a context in which the document is being invoked, e.g., reading vs. editing. The preferred screen locations may evolve by monitoring user interaction with the document and/or based on user preferences. Such preferred screen location information may therefore have no particular relevance when applied to other computer systems and/or when the document is accessed by another user. In this context, embedded preference information in the document would potentially be unusable or incorrect. Accordingly, current document model state information techniques are deficient in attempting to preserve a portion of the state information that would be considered relevant to a particular project (set of applications and documents, computer configuration and user. Normally, this information would be considered peripheral to the document and not captured by the computing system.

In another aspect, the current document model does not work well with database-based file systems in which actionable objects are represented as unique file system database objects. As described above, the idea of an actionable object may span several unique file system objects. For example, an Accounting Project cannot be properly expressed by any one software application object, document object, or data source object in isolation. Instead, projects are more appropriately defined as a combination of state information from all constituent database objects, inter-object relationship objects, and any additional state information associated with the project itself. Accordingly, current document model state information techniques are deficient in attempting to preserve state information that spans and relates multiple unique file system database objects.

Accordingly, there is a need for a system and method for managing content state in a database-based file system.

SUMMARY OF THE INVENTION

A system and method for representing content state in a file system is provided. A file system includes a unique database object that is representative of the object content. The unique database object serves as a link container and includes a plurality of links to additional unique database objects that are properties of the representation of content. The link container database object also maintains additional properties for the representation of content.

In accordance with an aspect of the present invention, a method for managing information is provided. The method may be implemented in a computer system having a file system in which objects are represented as unique items. In accordance with the method, a computing device generates a first unique item in the file system corresponding to a representation of content. The first unique item in the file system includes one or more fields associated with the representation of content, wherein at least one field corresponds to a link to at least one additional unique item utilized in conjunction with the representation of content.

In accordance with another aspect of the present invention, a computer-readable medium having computer-readable components for managing information associated with a computer system is provided. The computer-readable medium includes a unique file system object corresponding to a representation of content. The unique file system object includes one or more fields associated with the representation of content, wherein at least one field corresponds to a link to at least one additional unique file system object utilized in conjunction with the representation of content.

In accordance with a further aspect of the present invention, a method for managing information is provided. The method may be implemented in a computer system having a file system in which objects are represented as unique items. In accordance with the method, a computing device obtains a request to make a representation of content in the computer system file system. The computing device then generates a first unique item in the file system corresponding to the selected representation of content. The first unique item includes one or more fields associated with the representation of content, wherein at least one field corresponds to a link to at least one additional unique item utilized in conjunction with the representation of content. The computing device obtains a request to recall the representation of content associated with the first unique item. The computing device then recalls the first unique item and the at least one additional unique item utilized in conjunction with the representation of content by the first unique item.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a block diagram illustrative of a document revision history tracking various versions of a document and relationships between versions in accordance with an embodiment of the present invention;

FIG. 6 is a block diagram illustrative of a representation of content state associated with a document history tracking document version history in accordance with an illustrative embodiment of the present invention;

DETAILED DESCRIPTION OF THE PREFERRED EMBODIMENT

Generally described, the present invention relates to a management system for representing content state. More specifically, the present invention relates to a system and method for representing content state as a series of unique file system objects. Although the present invention will be described in relation to various embodiments relating to the representation of content state in a computer system, one skilled in the art will appreciate that the disclosed embodiments are illustrative in nature. Thus, the disclosed embodiments should not be construed as limiting.

Figure 1:
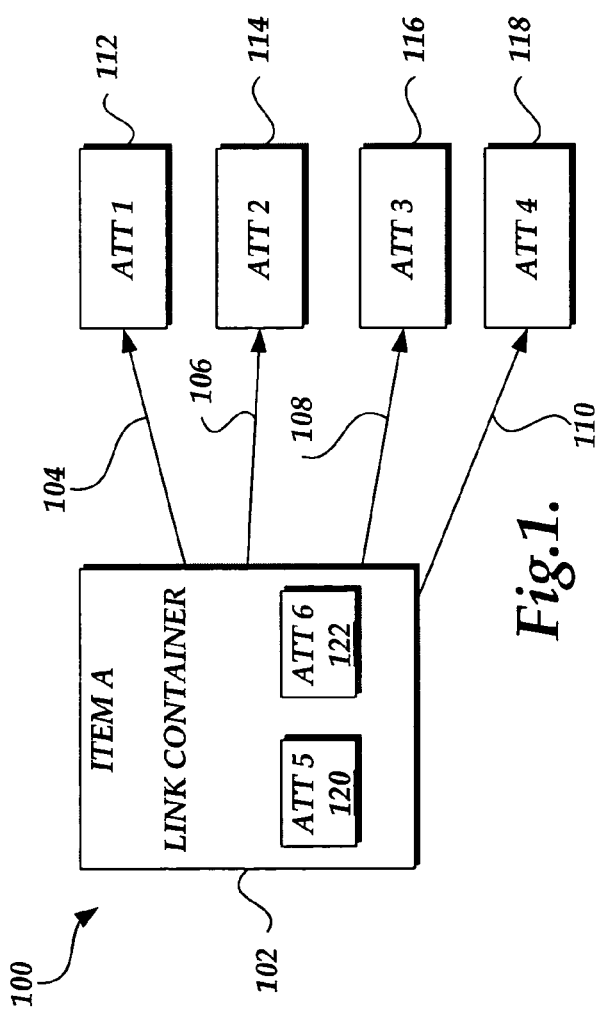
FIG. 1 is a block diagram illustrative of a representation of content state in a file system corresponding to a plurality of unique file system objects in accordance with the present invention.

FIG. 1 is a block diagram illustrative of a representation of content state 100 in a file system corresponding to a plurality of unique file system objects. In accordance with an illustrative embodiment of the present invention, the file system corresponds to a plurality of unique database objects that can be identified by an identifier, such as a global unique identifier. The database objects in the file system can be representative of data stored and used by the operating system and software applications. Additionally, the database objects can also be representative of one or more attributes/properties of other database objects or that define inter-relationships between other database objects.

With reference to FIG. 1, in accordance with the present invention, content state is represented through a number of linked database objects, or items. More specifically, and as illustrated in FIG. 1, content state 100 is represented by a first database object 102 representative of content state. The first database object 102 is generally referred to as a link container and includes various fields related to the representation of content state. In one aspect, the link container database object 102 can include one or more fields corresponding to links 104, 106, 108, 110 to other database objects 112, 114, 116, 118 that are associated with the representation of content. For illustrative purposes, the links 104, 106, 108, 110 include a reference to a unique identifier of a linked database object and also include additional information, e.g., properties, of the linked database object, which are stored in the link container database object 102. The specific properties represented by the links will depend on the database objects that are being linked and the particular link relationship being represented. The database object 102 can be defined in a manner that specifies what type of additional database objects may be associated, through links, with the representation of content and what properties of the relationship can be maintained. For example, a link to a database object corresponding to a software application may include properties of the software application, such as window position on a graphical user interface. Further, in an illustrative embodiment of the present invention, the links to database objects can correspond to pointers to database objects within a single computer file system or pointers to database objects across multiple computer system file systems, such as in a corporate network. In an illustrative embodiment of the present invention, the additional property information represented by the link is maintained in the link container database object 102.

In another aspect, the link container database object 102 can also include one or more fields 120, 122 that correspond to one or more properties of the representation of content that are maintained within the link container database object 102. The properties of fields 120, 122 are considered to be of a nature or size that allows the information to be properly stored with the link container database object 102. However, fields 120, 122 may also correspond to linked external database objects by design or as necessitated by size/format restrictions for particular representations of content. Although the content state model 100 is illustrated as having four fields corresponding to linked database objects and two fields corresponding to additional properties, one skilled in the relevant art will appreciate that any number of fields may be associated with a link container database object 102 for representing various types of content state.

Figure 2:
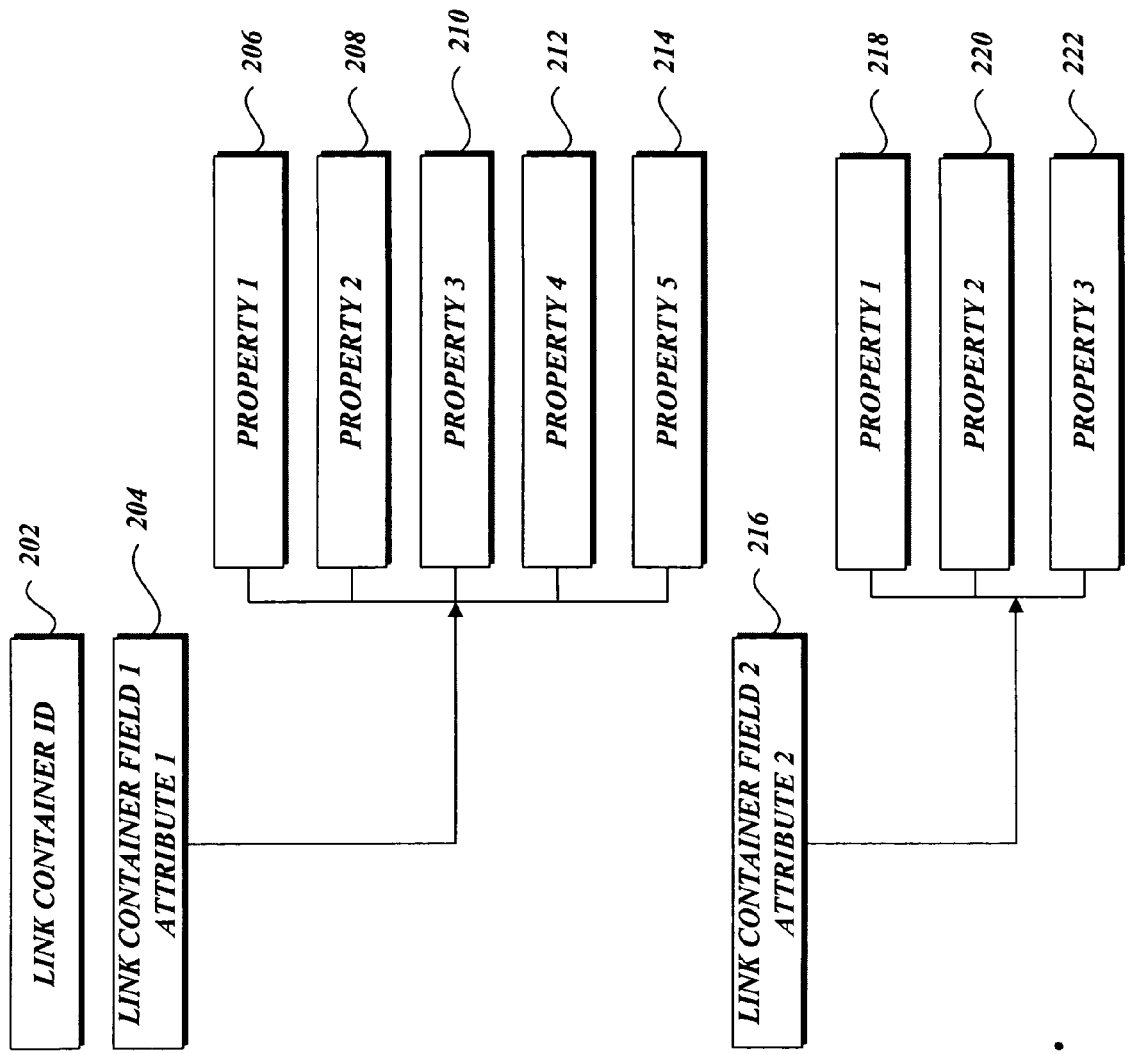
FIG. 2 is a block diagram illustrative of a definition of the contents of a unique files system object for representing content in accordance with the present invention.

With reference now to FIG. 2, in an illustrative embodiment of the present invention, the link container database object (e.g., first database object 102) may be defined according to a number of fields that correspond to one or more properties of the link container. As described above, the fields can correspond to links to other database objects and properties of the links or to one or more properties defined within the link container. In an illustrative embodiment of the present invention, each instance of the first database object 102 may be specified in a markup language, such as the extensible markup language (XML).

As illustrated in FIG. 2, an illustrative link container database object 102 can include a first field 202 for defining the type or class of representation of content. For example, the content representation field 202 may indicate that the representation of content corresponds to a project (e.g., user association of software applications) to allow the computer system to expect the definition of fields associated with the representation of the content state for a selected project. The illustrative link container database object 102 can also include a definition of two additional data fields 204, 216 that define the types of properties available for the representation of content. A first field definition, corresponding to data field 204, includes five additional property fields 206, 208, 210, 212 and 214 that can be defined for each instance of an object representing the attribute. For illustrative purposes, the first field definition in data field 204 can correspond to an external link to another database object. Accordingly, at least one of the properties, such as in property field 206, would correspond to the information identifying the other database object, such as its unique object identifier. Additional properties of the link, such as property fields 208-214, could correspond to information identifying specific properties of the linked database object with the particular representation of content (e.g., layout information for a linked software application).

In a similar manner, a second field definition, corresponding to data field 216 includes three additional properties 218, 220, and 222 that can be defined for each instance of an object representing the field. In comparison to data field 204, data field 216 can correspond to properties defined solely within the link container database object 102 by the three property data fields 218, 220, 222. Although the FIG. 2 only illustrates two data fields, one skilled in the relevant art will appreciate that the definition of a linked container database object model can include any number of field definitions and a wide variety of data field property organizations/definitions.

With reference now to FIGS. 3-9, the object model 100 (FIG. 1) may be applied to a number of embodiments in which content state of a group of information is maintained. The embodiments disclosed in FIGS. 3-9 are illustrative in nature and do not define all embodiments that may be achieved with the object model 100. Further, one skilled in the relevant art will appreciate that any number of design alternatives or additions may be utilized to implement the illustrative embodiments.

Figure 3:
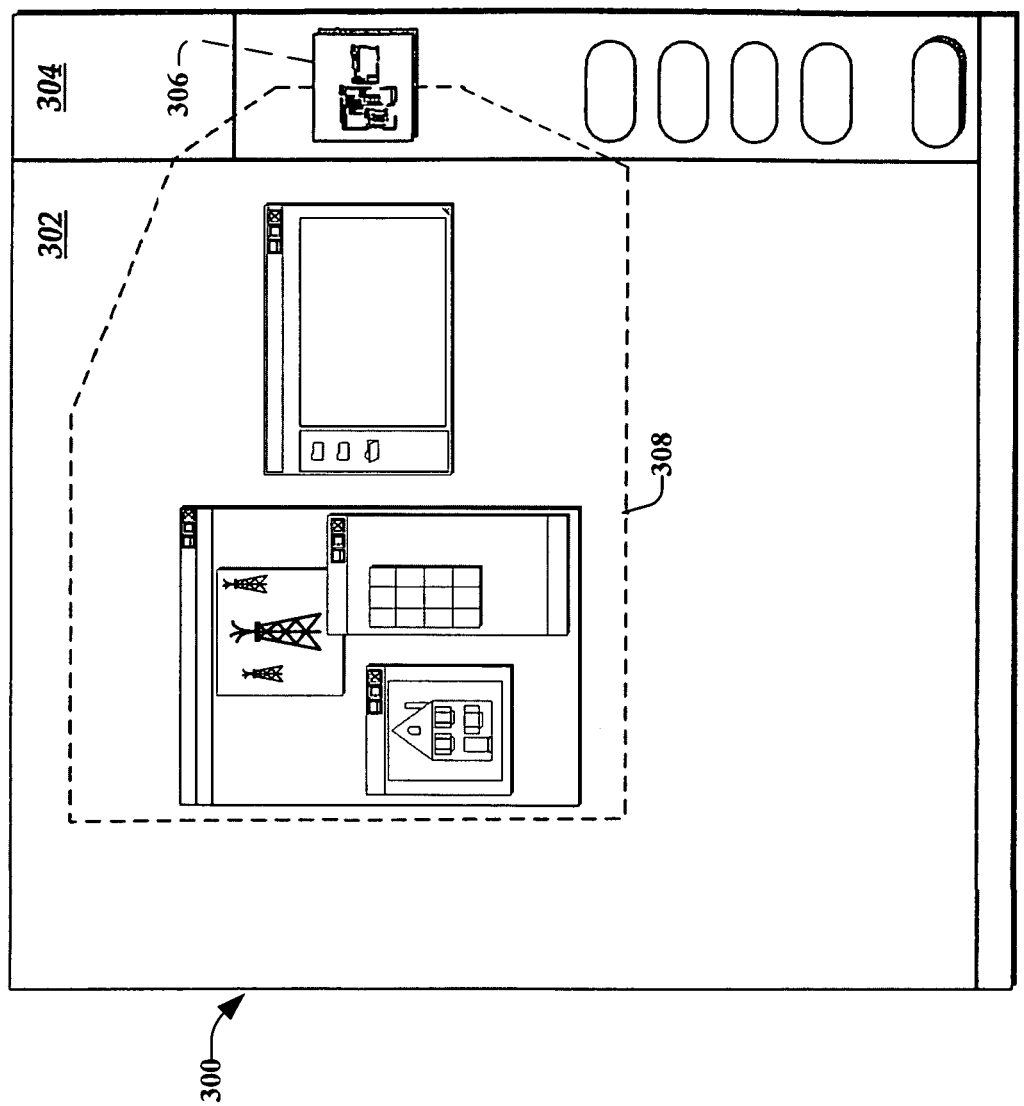
FIG. 3 is a block diagram of a computer display illustrative of a record of the display of one or more software applications in accordance with an embodiment of the present invention.

In an illustrative embodiment of the present invention, the content model 100 (FIG. 1) may be used to represent a record of the display and content state of one or more software applications that are instantiated on a graphical user interface of a software application at a particular time. The record is commonly referred to as a "snapshot." A snapshot does not necessarily correspond to an overt user association of multiple software applications and can apply solely to a record of any software application instantiated at the particular time the record information is stored. In an illustrative embodiment of the present invention, the content state preserved in the record can correspond to the software application instantiated on the graphical display and any additional content, such as an electronic document, associated with the instantiated software application. With reference now to FIG. 3, in an illustrative embodiment of the present invention, snapshots can be utilized in conjunction with a graphical user interface to allow users to capture and recall state information.

As illustrated in FIG. 3, the screen display 300 includes a graphical display section 302 and a control section 304. The control section 304 can include one or more manipulable controls 306 that are representative a record of the display of software applications on the graphical display section 302. The record can include a preview 308 that displays to a user what the record contains. For example, a series of snapshots of the display and content state of software applications can be utilized as part of a timeline record of use of a computer system. Likewise, snapshots of a display can be used as part of an operating system data recovery and backup function. The snapshot information may be manually collected based on user manipulation of a software control or as part of a scheduled state collection mechanism.

In accordance with an illustrative embodiment of the present invention, once the content state information is collected, manipulating the control 306 can result in the regeneration of the one or more software applications in the graphical display section 302. Additionally, the regeneration of the software applications can also include the recall of the content state that was being displayed at the time the record was last updated. For example, a user may be able to review of timeline of snapshots taken throughout the day and recall the software applications that were instantiated at a particular time of the day. Further, the user may be able to recall the particular version of content that was accessed by the software application at that time of day. A more detailed description of an illustrative incorporation of snapshot functionality into a user interface can be found in commonly assigned and co-pending U.S. application Ser. No. 10/679,796, entitled "SYSTEM AND METHOD FOR MANAGING SOFTWARE APPLICATIONS IN A GRAPHICAL USER INTERFACE, and filed on Oct. 6, 2003, which is hereby incorporated by reference.

Figure 4:
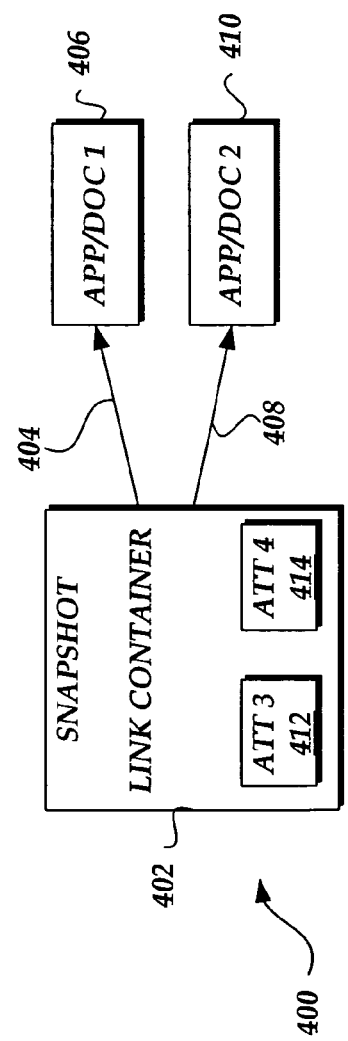
FIG. 4 is a block diagram illustrative of a representation of content state associated with a record of the display of one or more software application in accordance with an embodiment of the present invention.

With reference now to FIG. 4, the content model 100 (FIG. 1) may be utilized to represent the content 400 associated with a record of software applications instantiated on a graphical user interface (e.g., snapshot). As illustrated in FIG. 4, the content model 400 includes a first database object 402 that is representative of the content state of a record/snapshot as a link container database object. In an illustrative embodiment of the present invention, the particular instant of the snapshot link container database object 402 can include any number of fields that facilitates the representation of content state of the snapshot. As illustrated in FIG. 4, the illustrative link container database object 402 includes field links 404, 408 to two database objects 406, 410 that correspond to the particular piece of content that was being displayed on the two instantiated software applications. The field links 404, 408 can also correspond to the instantiated software applications themselves if no content is being displayed or the content is otherwise unavailable. As described above, the field links 404, 408 in the content model 400 can include various properties about the linked database objects, such as window position on the screen display and window layout information. Additionally, in an illustrative embodiment of the present invention, and as will be described in greater detail below, each linked database object 406, 410 can correspond to a link container database object that could include additional links to other database objects (such as for version information of a linked electronic document link container database object).

With continued reference to FIG. 4, the linked container database object 402 can also include fields 412, 414 that correspond to properties of the representation of content and that are maintained within the instance of the snapshot link container database object. For example, in an illustrative embodiment of the present invention, the fields 412, 414 can correspond to time stamp information, snapshot identification information (e.g., name and version) and the like. Each of the fields stored in the link container database object 402 can be utilized to restore the software applications and the content state of the software application. One skilled in the relevant art will appreciate that additional or alternative linked database objects and/or alternative or additional internal information may also be utilized in conjunction with the creation of a record/snapshot.

With reference now to FIGS. 5 and 6, in another illustrative embodiment of the present invention, the content model 100 (FIG. 1) may be used to represent the history and relationship of a user identifiable concept, such as an electronic document, a project, and the like. In accordance with this embodiment, the fields of the representation of content found in the linked container database object relate to each distinct evolution, version, or variation of the concept and/or the relationship between the distinct evolutions, versions, and variations of the concept. With reference to FIG. 5, the history of a document can include an original version 500, which spawns two additional versions 502 and 504. Version 502 further spawns another version 506 and version 504 spawns two additional versions 508 and 510. In each of the above examples, each version of the concept, e.g., document, corresponds to unique database object. By tracking when database objects are altered or copied, an operating system can maintain a link container database object 102 that tracks each distinct version and the relationship between versions. In accordance with an illustrative embodiment of the present invention, version information can be tracked to allow for previous changes to be recalled. Additionally, the relationship information between versions can also be tracked and displayed graphically as document metadata.

With reference now to FIG. 6, the content model 100 (FIG. 1) may be utilized to represent the content 600 associated with a concept history, which in the illustrative example of FIGS. 5 and 6 corresponds to an electronic document history. Although the concept history is illustrated with regard to a document history, one skilled in the relevant art will appreciate that concept history can extend to any user identifiable concept that includes distinct versions or evolutions. As illustrated in FIG. 6, the content model 600 includes a link container database object 602 that is representative of the content state of a concept history as a link container database object. In an illustrative embodiment of the present invention, the link container database object 604 can include field links 604, 606, 608, 610 to any number of additional database objects 612, 614, 616, 618. Each database object corresponds to a distinct version, evolution of the concept. For example, as described above, a new database object may be created each time a "Save As" function or "Copy" function is executed by the operating system. Additionally, as described above, the link container database object 602 can include additional property information about each link attribute 604, 606, 608 610, such as author information, the provenance of the version object, etc.

With continued reference to FIG. 6, the link container database object 602 can also include fields 620, 622 that define the relationship between the linked database objects. For example, the link container database object 602 can include a field 620 that maintains relationship information about each linked database object 612, 614, 616, 618. In another example, another field 622 in the link container database object 602 can store security information corresponding to each of the linked database object 612, 614, 616, 618. In an illustrative embodiment of the present invention, the linked container database object 602 may be utilized to recall previous versions of a concept, such as previous version of an electronic document. In a similar manner, the link container database object 602 may be used to access the most current version of a concept. Additionally, the link container database object 602 may be utilized to generate a display, such as an organizational map, of the version history of the concept. One skilled in the relevant art will appreciate that additional or alternative linked database objects may also be utilized in conjunction with the creation of an association.

Figure 7A:
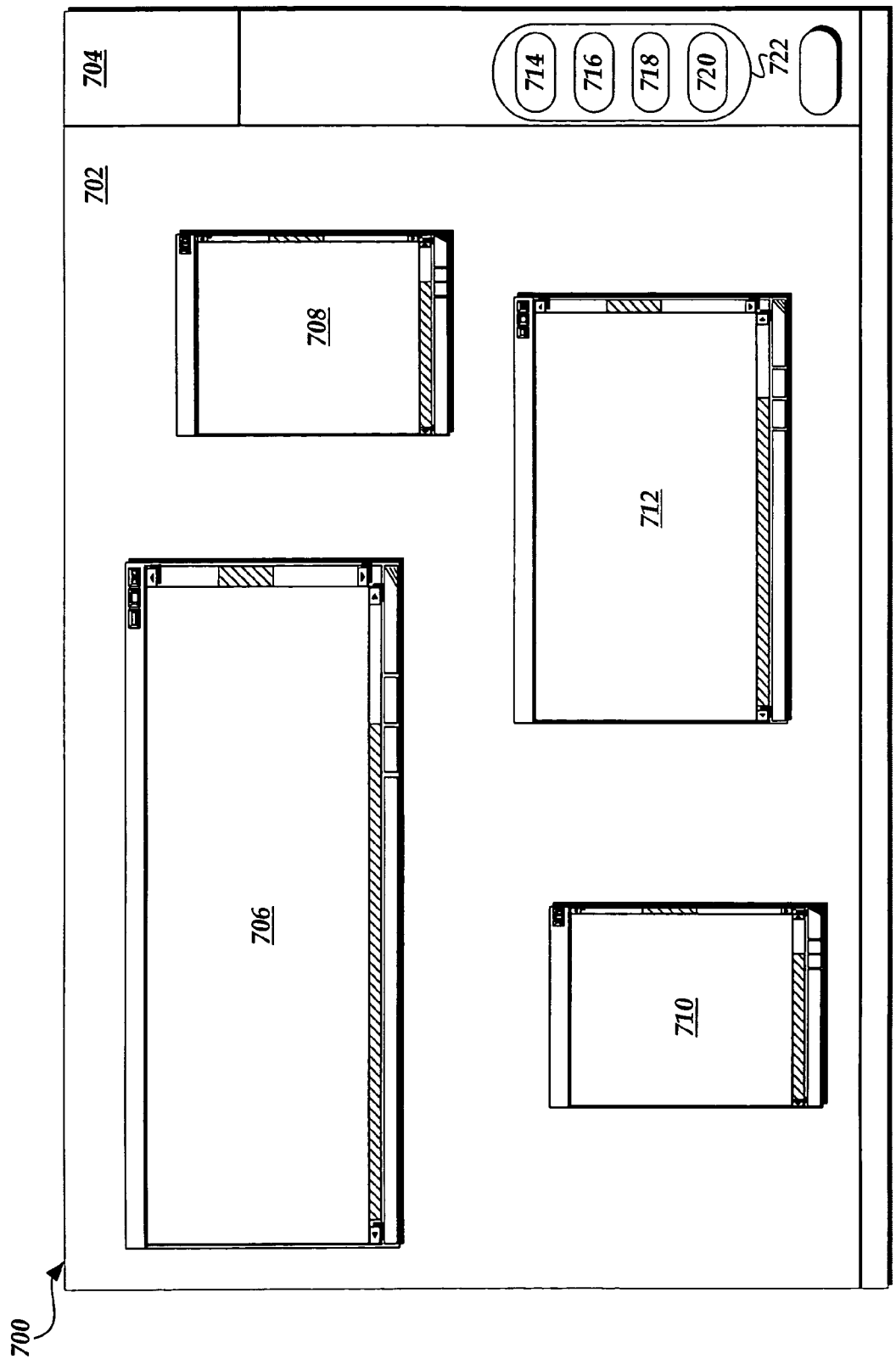
FIGS. 7A and 7B are block diagrams of a computer display illustrative of a user association of one or more software applications in accordance with an embodiment of the present invention.
Figure 7B:
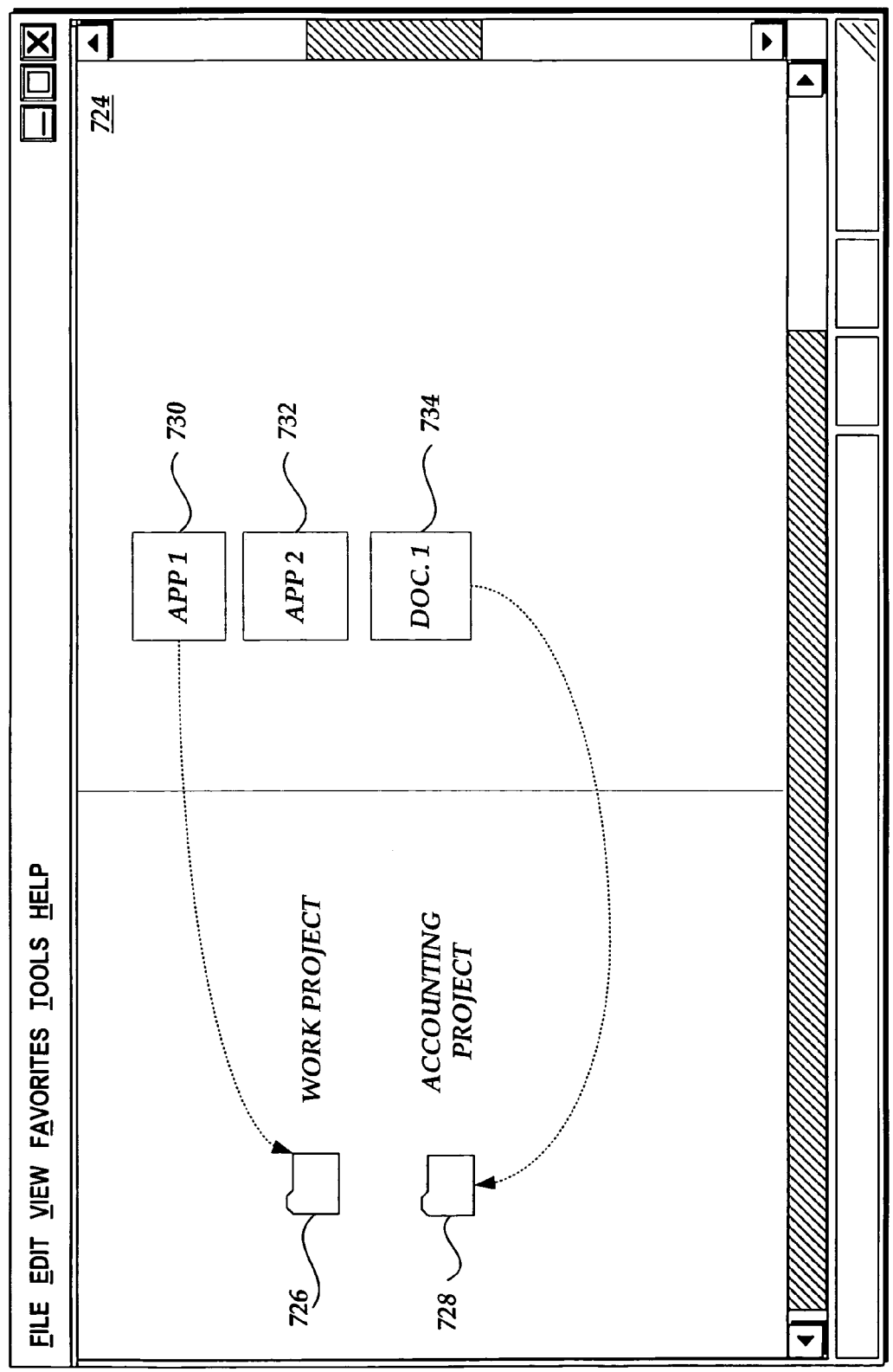
Figure 8:
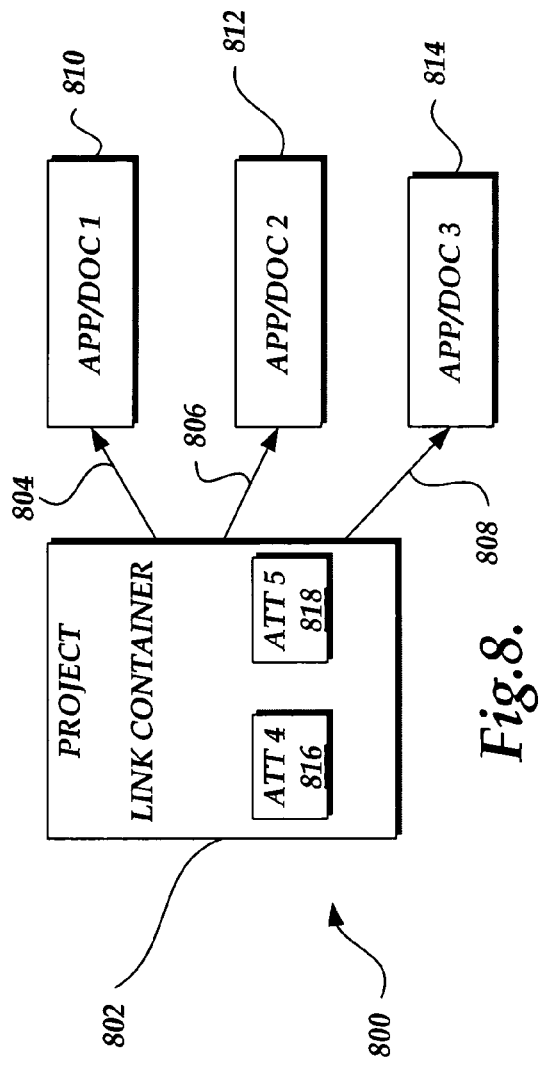
FIG. 8 is a block diagram illustrative of a representation of content state associated with a user association of one or more software application in accordance with an embodiment of the present invention.

With reference now to FIGS. 7A-7B and 8, in another illustrative embodiment of the present invention, the content model 100 (FIG. 1) may be used to represent content state corresponding to an association of one or more software applications that are instantiated on a graphical user interface of a software application, referred to as a "project." In an illustrative embodiment of the present invention, the particular software applications that are associated with a project may be defined according user criteria. For example, a user can group one or more software applications into a project that allows the user to access/manipulate the grouped software application via a set of project controls.

As illustrated in FIG. 7A, in an illustrative embodiment incorporating user projects, the screen display 700 includes a graphical display section 702 and a control section 704. The graphical display section 704 includes four graphical display windows 706, 708, 710 and 712 corresponding to instantiated software applications. The control section 704 can include one or more user controls that are representative of controls 714, 716, 718, and 720 for each instantiated software application. Additionally, the control section 704 includes an additional group control 722 representative of the association of the software application as a project. In accordance with an illustrative embodiment of the present invention, manipulating the control 722 can result in the regeneration of the one or more software applications in the graphical display section 702. Additionally, the regeneration of the software applications can also include the recall of the content that was being displayed at the time the project was last updated. A more detailed description of an illustrative incorporation of group control functionality into a user interface, such as for projects, can be found in commonly assigned and co-pending U.S. application Ser. No. 10/679,796, entitled "SYSTEM AND METHOD FOR MANAGING SOFTWARE APPLICATIONS IN A GRAPHICAL USER INTERFACE, and filed on Oct. 6, 2003, which has been incorporated by reference.

With reference now to FIG. 7B, in an alternative embodiment of the present invention, user associations of software applications can also be achieved in graphical user interface as "folders." One skilled in the relevant art will appreciate that graphical user interfaces utilizing folder representations correspond to an association of one or more pieces of data that are represented as graphical icons. Additionally, folders allow users to select one or more graphical icons and "drop" them into the folder for inclusion in the folder. In accordance with an embodiment utilizing projects, a screen display 724 can include one or more folders 726, 728 in which the folders represent a user project. To add software applications to a project, a user can select a graphical icon corresponding to a software application, such as icons 730 or 732, and "drop" the icon in the project folder. As illustrated in FIG. 7B, icon 730 is added to the "WORK PROJECT" by being dropped in folder 726 on the display. Additionally, specific content, such as a graphical icon corresponding to a particular electronic document, such as icon 734, may be added to the project such that the software application and the particular electronic document would be associated with the project. FIG. 7B also illustrates the addition of the document corresponding to icon 734 by dropping it in the "ACCOUNTING PROJECT" corresponding to folder 728. To recall the display of all the software applications, and their associated content, in a project, a user can manipulate the folder icons 726, 728, such as by a mouse double click, that causes the associated software application to be instantiated in a manner defined by the project.

With reference now to FIG. 8, the content model 100 (FIG. 1) may be utilized to represent the content 800 associated with content state for an association of software applications instantiated on a graphical user interface as a project. As illustrated in FIG. 8, the content model 800 includes a first database object 802 that is representative of the content state of the project as a link container database object. In an illustrative embodiment of the present invention, the link container database object 802 can include a number of fields that correspond to the representation of content state for the instance of the project. As illustrated in FIG. 8, the illustrative link container database object 802 includes field links 804, 806, 808 to three database objects 810, 812, 814 that correspond to the particular piece of content that was being displayed on the three instantiated software applications. Alternatively, one or more of the field links may correspond to an instantiated software application without regard to the particular piece of content displayed by the software application. As described above, the field links 804, 806, 808 in the content model 800 can include various properties about the linked database objects, such as window position on the screen display and window layout information. Additionally, in an illustrative embodiment of the present invention, and as will be described in greater detail below, each linked database object 810, 812, 814 can include additional links to other database objects (such as for version information of an electronic document) according to the representation of content for the software application.

With continued reference to FIG. 8, the linked container database object 802 can also include fields 816, 818 that correspond to properties of the representation of content and that are maintained within the instance of the project link container database object. For example, in an illustrative embodiment of the present invention, the fields 816, 818 can correspond to project identification information, software application relationship information and the like. Each of the fields stored in the link container database object 802 can be utilized to restore the software applications and the content state of the software application. One skilled in the relevant art will appreciate that additional or alternative linked database objects and/or alternative or additional internal information may also be utilized in conjunction with the creation of a project.

Figure 9:
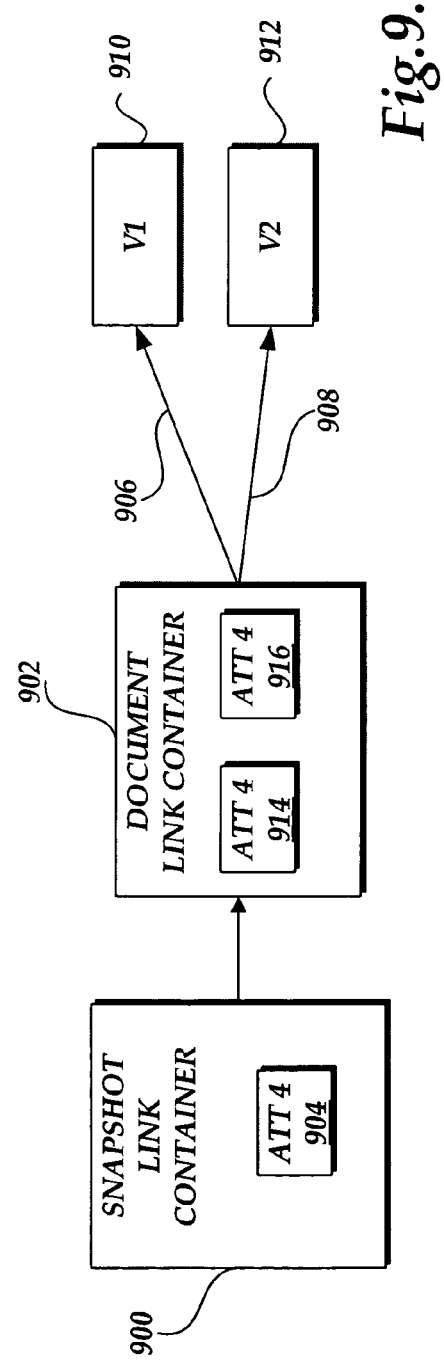
FIG. 9 is a block diagram of a content model illustrating a set of linked display objects for representing content in accordance with an embodiment of the present invention.

With reference now to FIG. 9, and as previously discussed, the content models 100, 400, 600, 800 may include a series of linked objects in which a link container database objects has links to other link container database objects. As illustrated in FIG. 9 and previously discussed, a snapshot link container database object 900 can include a number of fields including links to other database objects, such as a link 902 to a software application link container database object 906, and internally maintained fields, such as field 904. Additionally, the software application link container database object 906 can include additional field links 908, 910 to additional database objects 912, 914 corresponding to distinct versions/evolutions of a document in the software application. Accordingly, accessing the project link container 900 also results in accessing the document link container 906. In a similar manner, a project link container database object can include links to another link container database object that tracks project history in a manner as also described above with regard to FIGS. 5 and 6. Accordingly, the present invention can correspond to an extensible, customizable platform for representing content state.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a computer system having a file system in which objects are represented as unique items, a method for managing information within the file system, and to thereby transform the file system, the method comprising:

generating, by operation of a computing device, a first unique item in the file system corresponding to a representation of content and content state information of an object, including at least one field associated with the representation of content, wherein a field of the at least one field corresponds to a link to at least one additional unique item utilized in conjunction with the representation of content state information by the first unique item, and wherein the first unique item generated corresponds to a concept history and includes links to at least one unique item embodying a distinct version of the concept, the distinct version of the concept comprising a distinct version of a document and a corresponding unique database object, wherein the document and the corresponding unique database object are defined on the file system; and wherein the content includes at least one instantiated software application on a graphical user interface, and the content state information includes information about the object that spans and relates multiple unique items.

2. The method as recited in claim 1, generating the first unique item includes generating the first unique item that includes a plurality of links to unique items utilized in conjunction with the representation of content by the first unique item.

3. The method as recited in claim 1, generating the first unique item includes generating the first unique item that includes a link to a second unique item corresponding to a separate representation of content, and wherein the second unique item includes a link to at least one additional unique item utilized in conjunction with the representation of content by the second unique item.

4. The method as recited in claim 1, generating the first unique item includes generating the first unique item that corresponds to a record of the display of at least one software application displayed on a graphical display of the computer system and includes links to at least one unique item corresponding to the at least one software application associated with the record of the display.

5. The method as recited in claim 4, generating the first unique item includes generating the first unique item that maintains at least one attribute embodying an appearance of the at least one software application in the record of the display.

6. The method as recited in claim 4, the generating includes generating the first unique item where the link to the at least one unique item corresponding to the at least one software application associated with the record of the display corresponds to a link to an electronic document corresponding to the at least one instantiated software application.

7. The method as recited in claim 4, the generating includes generating the first unique item where the link to the at least one unique item corresponding to the at least one software application associated with the record of the display corresponds to a link to the at least one instantiated software application.

8. The method as recited in claim 4, generating the first unique item includes generating the first unique item that includes at least one attribute embodying time stamp information corresponding to a time when the record of the display was last updated.

9. The method as recited in claim 1, generating the first unique item includes generating the first unique item that maintains an attribute embodying a link to every distinct version of the concept.

10. The method as recited in claim 1, the generating includes generating the first unique item where the concept is a document in the file system.

11. The method as recited in claim 1, generating the first unique item includes generating the first unique item that corresponds to a user association of at least one software application displayed on a graphical display of the computer system and includes links to at least one unique item corresponding to the at least one software application in the user association.

12. The method as recited in claim 11, generating the first unique item includes generating the first unique item that maintains at least one attribute created by the at least one software application.

13. The method as recited in claim 11, the generating includes generating the first unique item where the link to the at least one unique item corresponding to the at least one software application associated with the record of the display corresponds to a link to an electronic document corresponding to the at least one instantiated software application.

14. The method as recited in claim 11, the generating includes generating the first unique item where the link to the at least one unique item corresponding to the at least one software application associated with the record of the display corresponds to a link to the at least one instantiated software application.

15. A computer system having a file system, the computer system comprising:
a file system component generating, by operating of a computing device, a unique file system object corresponding to a representation of content and content state information of an object, including at least one field associated with the representation of content, wherein a field of the at least one field corresponds to a link to at least one additional unique file system object utilized in conjunction with the representation of content state information by the unique file system object, wherein the unique file system object corresponds to a concept history and includes links to at least one unique file system object embodying a distinct evolution of the concept, the distinct evolution of the concept comprising a distinct version of a document and a corresponding unique database object, wherein the document and the corresponding unique database object are defined on the file system; and
wherein the content includes at least one instantiated software application on a graphical user interface, and the content state information includes information about the object that spans and relates multiple unique items.

16. The computer system as recited in claim 15, wherein the first file system object includes a plurality of links to additional unique file system objects utilized in conjunction with the representation of content by the unique file system object.

17. The computer system as recited in claim 16, wherein at least one of the additional unique file system objects corresponds to a representation of content and includes to at least one additional unique file system object utilized in conjunction with the representation of content by the additional unique file system object.

18. The computer system as recited in claim 15, wherein the first unique file system object corresponds to a record of the display of at least one software application displayed on a graphical display of the computer system and includes links to at least one unique file system object corresponding to the at least one software application in corresponding to the record of the display.

19. The computer system as recited in claim 18, wherein the link to the at least one unique file system object corresponding to the at least one software application associated with the record of the display corresponds to a link to an electronic document corresponding to the at least one instantiated software application.

20. The computer system as recited in claim 18, wherein the link to the at least one unique item corresponding to the at least one software application associated with the record of the display corresponds to a link to the at least one instantiated software application.

21. The computer system as recited in claim 15, wherein the unique file system object includes at least one attribute linked to a document created by the at least one software application in the record of the display.

22. The computer system as recited in claim 15, wherein the unique file system object maintains an attribute corresponding to every distinct evolution represented as a link in the unique file system object.

23. The computer system as recited in claim 15, wherein the concept is an electronic document.

24. The computer system as recited in claim 15, wherein the first unique file system object corresponds to a user association of at least one software application displayed on a graphical display of the computer system and links to at least one unique file system object corresponding to the at least one software application in the user association.

25. The computer system as recited in claim 24, wherein the unique file system object maintains an attribute embodying a relationship between the at least one software application in the user association.

26. The computer system as recited in claim 24, wherein the unique file system object maintains properties associated with the display of the at least one software application in the user association.

27. The computer system as recited in claim 24, wherein the link to the at least one unique file system object corresponding to the at least one software application in the user association corresponds to a link to an electronic document corresponding to the at least one instantiated software application.

28. The computer system as recited in claim 24, wherein the link to the at least one unique item corresponding to the at least one software application in the user association corresponds to a link to the at least one instantiated software application.

29. In a computer system having a file system in which objects are represented as unique items, a method for managing information within the file system, comprising:

obtaining a request to make a representation of content and content state information of an object in the computer system file system;

generating, by operation of a computing device, a first unique item in the file system corresponding to a selected representation of content and content state information of the object, the first unique item including at least one field associated with the selected representation of content and content state information, wherein a field of the at least one field corresponds to a link to at least one additional unique item utilized in conjunction with the selected representation of content state information by the first unique item, wherein the unique file system object corresponds to a concept history and includes links to at least one unique file system object embodying a distinct evolution of the concept, the concept history comprising at least one distinct evolution of the concept and each distinct evolution of the concept comprising a distinct version of a document and a corresponding unique database object, wherein the document and the corresponding unique database object are defined on the file system;

wherein the content includes at least one instantiated software application on a graphical user interface, and the content state information includes information about the object that spans and relates multiple unique items;

obtaining a request to recall the selected representation of content and content state information associated with the first unique item;

recalling the first unique item in the file system; and recalling the at least one additional unique item utilized in conjunction with the selected representation of content state information by the first unique item.

30. The method as recited in claim 29, generating the first unique item includes generating the first unique item that corresponds to a concept history and wherein recalling the first unique item includes recalling a linked unique item describing concept version history.

31. The method as recited in claim 29, generating the first unique item includes generating the first unique item that corresponds to a record of the display of at least one software application displayed on a graphical display of the computer system and wherein recalling the first unique item includes recalling a linked unique item for each of at least one software application included in the record of the display.

32. The method as recited in claim 31, wherein recalling the first unique item further includes recalling a plurality of properties describing appearance of each of the at least one software application included in the record of the display.

33. The method as recited in claim 29, generating the first unique item includes generating the first unique item that corresponds to a concept history and wherein recalling the second unique item includes recalling links to a distinct version of the concept.

34. The method as recited in claim 29, generating the first unique item includes generating the first unique item that corresponds to a user association of at least one software application displayed on a graphical display of the computer system and wherein recalling the first unique item includes recalling a linked unique item for each of at least one software application included in the user association.

* * * * *